(12) United States Patent
Sant et al.

(10) Patent No.: US 11,040,898 B2
(45) Date of Patent: Jun. 22, 2021

(54) BUFFER-FREE PROCESS CYCLE FOR CO2 SEQUESTRATION AND CARBONATE PRODUCTION FROM BRINE WASTE STREAMS WITH HIGH SALINITY

(71) Applicant: THE REGENTS OF THE UNIVERSITY OF CALIFORNIA, Oakland, CA (US)

(72) Inventors: Gaurav Sant, Oakland, CA (US); Zongsu Wei, Oakland, CA (US); Bu Wang, Oakland, CA (US); Erika Callagon La Plante, Oakland, CA (US); Dante Simonetti, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 162 days.

(21) Appl. No.: 16/431,300

(22) Filed: Jun. 4, 2019

(65) Prior Publication Data
US 2019/0367390 A1 Dec. 5, 2019

Related U.S. Application Data

(60) Provisional application No. 62/680,987, filed on Jun. 5, 2018.

(51) Int. Cl.
*C02F 1/68* (2006.01)
*C01D 7/12* (2006.01)
(Continued)

(52) U.S. Cl.
CPC .............. *C02F 1/683* (2013.01); *C01D 7/12* (2013.01); *C01D 7/16* (2013.01); *C02F 1/442* (2013.01);
(Continued)

(58) Field of Classification Search
CPC .......... C02F 1/683; C02F 1/444; C02F 1/442; C02F 2305/00; C02F 2103/08;
(Continued)

(56) References Cited

U.S. PATENT DOCUMENTS

| 3,725,259 | A | * | 4/1973 | Depree | .................... C02F 9/00 210/674 |
| 5,043,017 | A | * | 8/1991 | Passaretti | .............. D21H 17/69 106/465 |
| 5,362,460 | A | * | 11/1994 | Laird | ....................... C01F 5/22 423/157.4 |
| 2003/0213937 | A1 | * | 11/2003 | Yaniv | ....................... A61K 8/19 252/500 |

(Continued)

*Primary Examiner* — Fred Prince
(74) *Attorney, Agent, or Firm* — Foley & Lardner LLP

(57) ABSTRACT

A method includes: (1) using a chelating agent, extracting divalent ions from a brine solution as complexes of the chelating agent and the divalent ions; (2) using a weak acid, regenerating the chelating agent and producing a divalent ion salt solution; and (3) introducing carbon dioxide to the divalent ion salt solution to induce precipitation of the divalent ions as a carbonate salt. Another method includes: (1) combining water with carbon dioxide to produce a carbon dioxide solution; (2) introducing an ion exchanger to the carbon dioxide solution to induce exchange of alkali metal cations included in the ion exchanger with protons included in the carbon dioxide solution and to produce a bicarbonate salt solution of the alkali metal cations; and (3) introducing a brine solution to the bicarbonate salt solution to induce precipitation of divalent ions from the brine solution as a carbonate salt.

6 Claims, 2 Drawing Sheets

(51) Int. Cl.
*C01D 7/16* (2006.01)
*C02F 1/44* (2006.01)
*C02F 103/08* (2006.01)
*C02F 103/10* (2006.01)

(52) U.S. Cl.
CPC .......... *C02F 1/444* (2013.01); *C02F 2103/08* (2013.01); *C02F 2103/10* (2013.01); *C02F 2305/00* (2013.01)

(58) Field of Classification Search
CPC .... C02F 2103/10; C02F 2303/16; C02F 1/52; C02F 1/66; C02F 1/265; C02F 1/441; C02F 1/68; C02F 1/42; C02F 2001/45; C02F 9/00; C01D 7/12; C01D 7/16; C01F 11/005; C01F 11/18; C01F 5/24
USPC .......................... 210/665, 666, 667, 670, 673
See application file for complete search history.

(56) References Cited

U.S. PATENT DOCUMENTS

| | | | |
|---|---|---|---|
| 2005/0180910 A1* | 8/2005 | Park | C01F 5/24 423/432 |
| 2009/0001020 A1* | 1/2009 | Constantz | C02F 1/66 210/652 |
| 2009/0013742 A1* | 1/2009 | Zhang | C02F 1/683 71/12 |
| 2009/0056707 A1* | 3/2009 | Foody | B01J 39/04 127/46.2 |
| 2009/0214408 A1* | 8/2009 | Blake | C01D 7/00 423/232 |
| 2011/0195017 A1* | 8/2011 | Martinez Martinez | C01F 5/22 423/637 |
| 2015/0307400 A1* | 10/2015 | Devenney | C04B 28/10 106/817 |

* cited by examiner

BUFFER-FREE PROCESS CYCLE FOR CO2 SEQUESTRATION AND CARBONATE PRODUCTION FROM BRINE WASTE STREAMS WITH HIGH SALINITY

CROSS-REFERENCE TO RELATED APPLICATIONS

This application claims the benefit of U.S. Provisional Application No. 62/680,987, filed Jun. 5, 2018, the contents of which are incorporated herein by reference in their entirety.

STATEMENT OF GOVERNMENT SUPPORT

This invention was made with government support under Grant Numbers DE-FE0029825 and DE-FE0031705, awarded by U.S. Department of Energy. The government has certain rights in the invention.

TECHNICAL FIELD

This disclosure generally relates to a carbonation route for carbon dioxide ($CO_2$) sequestration.

BACKGROUND

Mineralization is a safe, long-term, stable, and environmentally friendly method for $CO_2$ sequestration. However, economically viable mineralization is challenging due to the large amounts of chemicals included for pH swing and energy consumed during the process. Therefore, sustainable processes featuring streamlined operation, high yield, and reduced chemical use, and from which valuable products can be derived—hence offsetting operational costs—are highly desired for $CO_2$ capture and storage.

It is against this background that a need arose to develop the embodiments described herein.

SUMMARY

In some embodiments, a method includes: (1) using a chelating agent, extracting divalent ions from a brine solution as complexes of the chelating agent and the divalent ions; (2) using a weak acid, regenerating the chelating agent and producing a divalent ion salt solution; and (3) introducing carbon dioxide to the divalent ion salt solution to induce precipitation of the divalent ions as a carbonate salt.

In additional embodiments, a method includes: (1) combining water with carbon dioxide to produce a carbon dioxide solution; (2) introducing an ion exchanger to the carbon dioxide solution to induce exchange of alkali metal cations included in the ion exchanger with protons included in the carbon dioxide solution and to produce a bicarbonate salt solution of the alkali metal cations; and (3) introducing a brine solution to the bicarbonate salt solution to induce precipitation of divalent ions from the brine solution as a carbonate salt.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Brine waste streams can be an excellent medium and reactant for $CO_2$ mineralization because of the amount of wastewater available and the concentrations (e.g., about 100,000 ppm or more) of the divalent ions (e.g., $Ca^{2+}$ and $Mg^{2+}$) in these streams. For example, shale gas production is accompanied by the generation of a brine waste stream called "produced water" during hydraulic fracking. In 2014, the quantity of such waste brine is more than about 22 billion barrels in the United States, offering substantial storage capacity for $CO_2$. Although treatment and reuse of produced water is constrained by its high salinity (e.g., about 400,000 ppm), selective extraction of divalent ions like $Ca^{2+}$ and $Mg^{2+}$ contained in the waste stream can allow subsequent $CO_2$ mineralization and production of carbonate salts (e.g., $CaCO_3$, $MgCO_3$, and their related forms). However, the carbonation process is challenged by the relatively low concentrations of divalent ions (e.g., $Ca^{2+}$ and $Mg^{2+}$) in the brine. Therefore, an operationally stable and environmentally acceptable method of enrichment of such divalent ions is desired to improve the carbonation process. One method of divalent metal extraction entails the use of recyclable materials (e.g., chelating agents, metal oxide sorbents, and polymers with ion exchanging groups) that can effectively uptake the desired ions from produced water and be readily regenerated or recovered. In this cyclic protocol, waste stream generation is reduced, potentially allowing for the realization of a zero-liquid-discharge system. As such, developing reliable methods to enrich divalent ions from brine waste streams while recovering and recycling the reaction precursors is desired in the practice of $CO_2$ mineralization.

Figure 1:
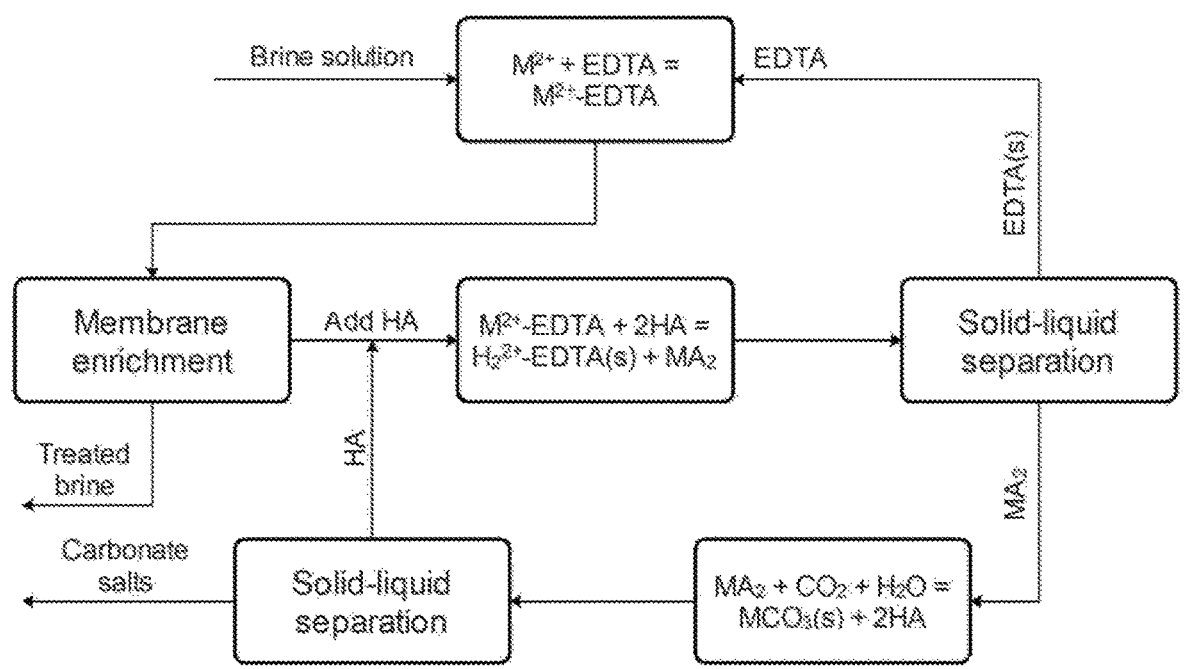
FIG. 1. A schematic of a process cycle for $CO_2$ sequestration and carbonate production.

Some embodiments of this disclosure are directed to a process cycle to separate and enrich divalent cations such as $Ca^{2+}$ and $Mg^{2+}$ from high salinity brine solutions for $CO_2$ mineralization without requiring the use of an alkaline buffer. The process cycle includes three interlinked stages (shown in FIG. 1): (1) divalent ion extraction with a chelating agent and membrane filtration; (2) regeneration of the chelating agent using a weak acid (e.g., to a pH of about 2 or lower); and (3) production of carbonates following $CO_2$ injection, and recovery of the weak acid. By designing an integrated process, the use of expensive consumable chemicals is reduced through continuous recycling of the relevant reagents. The process cycle is also advantageous in the aspect of energy consumption because it does not involve energy-intensive stages such as electrolysis or temperature swing.

1) Divalent Ion Extraction from Brines

Figure 2:
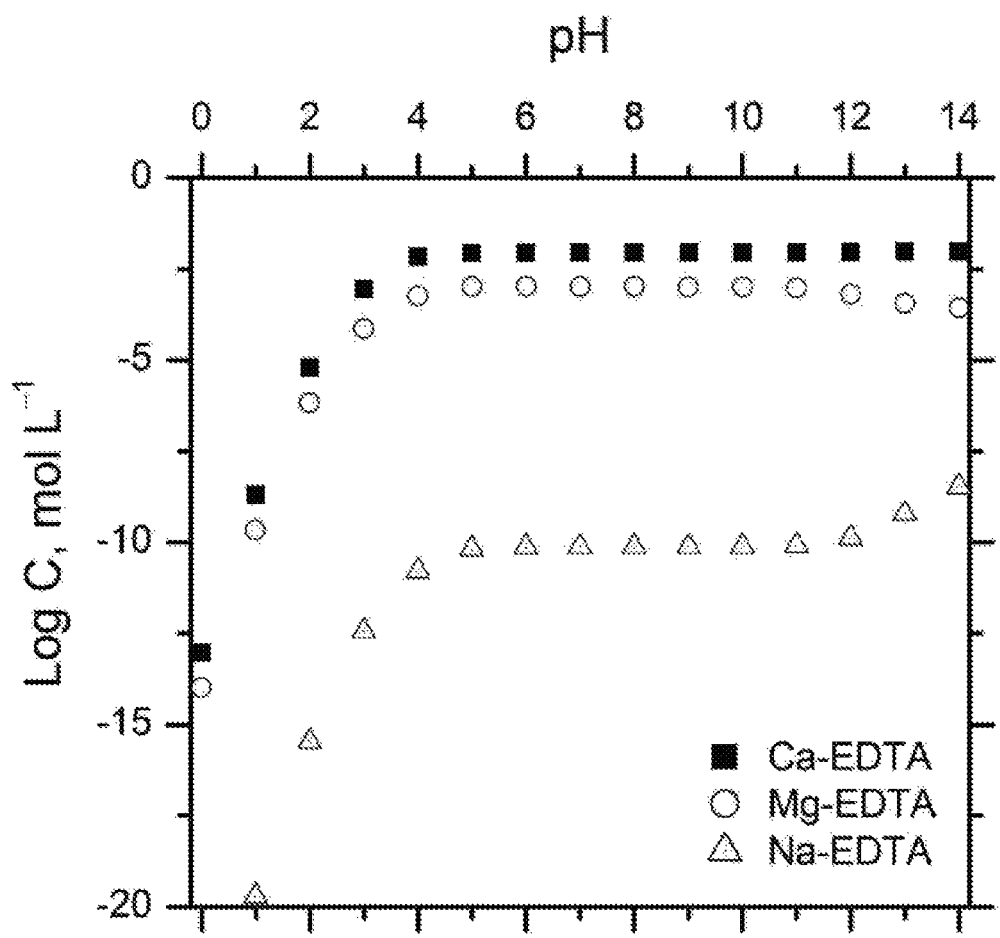
FIG. 2. Representative ethylenediaminetetraacetic acid (EDTA) complex concentrations in a brine solution as a function of pH, as calculated using the chemical equilibrium software Visual MINTEQ 3.1. The logarithm of the concentration (log C), in molarity, represents the concentration of metal complex species of Ca, Mg, and Na, with EDTA. The complexes remain stable at neutral and alkaline pH conditions typical of produced water. As pH decreases, the concentrations of the different complexes rapidly decrease due to the precipitation of an acidic EDTA salt. The concentration of the EDTA complex with the monovalent $Na^+$ ions is negligible compared to the complexes with divalent ions. This example calculation is for an open system at ambient temperature and pressure in which the initial EDTA, Ca, Mg, and Na concentrations are 0.01 M.

In this stage, divalent ions (or other multivalent ions) with potential for carbonation (e.g., those that can form carbonate solids by reacting with $CO_2$) in a brine solution are enriched and then separated from the solution. This is achieved by adding or introducing a chelating agent, such as ethylenediaminetetraacetic acid (EDTA) or nitrilotriacetic acid (NTA), into the brine solution under ambient conditions to promote their complexation with the target ions (e.g., $Ca^{2+}$ and $Mg^{2+}$), as given by:

$$M^{2+} + EDTA \rightarrow M^{2+}\text{-}EDTA \qquad (1)$$

where M denotes divalent ions, and EDTA is given as an example reagent. Other chelating agents that can form aqueous complexes via coordination bonds with divalent ions, such as other polydentate chelating agents, can also be used. It is desired to select an appropriate chelating agent to selectively extract target divalent ions from high salinity brines because of the high concentrations of alkali metal chlorides presented in the high salinity brines. For instance, brines obtained from desalination of sea water and treatment of produced water are rich in sodium chloride (NaCl). When EDTA is used, $Ca^{2+}$ and $Mg^{2+}$ can be selectively extracted because of EDTA's stronger preference for complexation with divalent ions compared to monovalent ions (e.g., Na+), as shown in FIG. 2. The $Ca^{2+}$- and $Mg^{2+}$-EDTA complexes have larger sizes, and thus can be readily separated using membrane filtration, such as through ultrafiltration (e.g., a polysulfone ultrafiltration unit with a pore size from about 10 nm to about 100 nm) or nanofiltration (e.g., a nanofiltration unit with a pore size from about 1 nm to about 10 nm). A membrane filtration unit can be operated in a cross-flow mode continuously to concentrate the $Ca^{2+}$- and $Mg^{2+}$-EDTA complexes in a retentate while monovalent ions (e.g., Na+, K+, and Cl−) permeate through the membrane pores. The retentate solution, which is then collected, is thus enriched with $Ca^{2+}$ and $Mg^{2+}$ in the form EDTA complexes in an aqueous phase so that the volume of liquid can be reduced by about 10 to about 100 times. The significant reduction in the liquid volume to be handled can significantly lessen the energy and chemical use in the subsequent stages of the process.

2) Regeneration of Chelating Agent with Weak Acid

In the next stage, the chelating agent is recycled from the enriched divalent ion solution by acidification. In the case of EDTA, the mechanism is described by the following reaction:

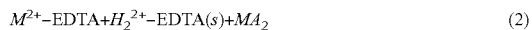

$$M^{2+}\text{-}EDTA + H_2 \rightarrow^{2+}\text{-}EDTA(s) + MA_2 \qquad (2)$$

In this reaction, a weak acid (HA) is added or introduced into, or otherwise combined with, the solution to precipitate EDTA as solid particles (EDTA(s)) while the divalent ions remain in an aqueous form as dissolved salts ($MA_2$). As shown in FIG. 2, the concentrations of aqueous EDTA complexes begin to decrease as the solution is acidified to a pH of about 4 or lower due to the precipitation of EDTA solids. Unlike other EDTA regeneration processes wherein strong acids, such as hydrochloric acid, are used, the process cycle uses a weak acid, so that the resulting divalent ion salt solution ($MA_2$) can further be treated to produce carbonates and to regenerate the weak acid. When an acid stronger than carbonic acid is used, carbonation to regenerate such acid is generally not thermodynamically favorable. Options of such weak acids include acetic acid, formic acid, lactic acid, oxalic acid, another organic acid, or other acids having a $pK_a$ greater than about 3.6 at 298 K, such as about 3.7 or greater, about 3.8 or greater, about 3.9 or greater, about 4 or greater, about 4.3 or greater, about 4.5 or greater, or about 4.7 or greater, and up to about 8 or greater, up to about 10 or greater, or up to about 12. A concentrated solution of such weak acid is used to acidify the $M^{2+}$-EDTA solution obtained from stage (1). For instance, acetic acid can be used to achieve a pH of about 1 to about 3 (e.g., about 2), under which conditions the level of EDTA recovery can reach about 50%. After the precipitation reaction, the EDTA in solid form can be separated from the solution using a solid-liquid separation method, such as filtration or sedimentation/clarification. The collected EDTA is recycled for divalent ion extraction in stage (1), while the salt solution containing the divalent ions is transferred to a carbonation reactor as an input or a feed stream.

3) Carbonation Process and Acid Recovery

In this stage, the concentrated divalent ion salt solution ($MA_2$) from stage (2) is first diluted with a mixture of treated brine in stage (1) and fresh water to a predetermined concentration based on the type of weak acid used in stage (2) and the $CO_2$ concentration in a gas stream. The starting concentration of $MA_2$ in the diluted solution is adjusted so that the solution pH is above the value (above about 3.6) of a carbonic acid solution in equilibrium with the $CO_2$-containing gas stream. To further increase the pH for favorable precipitation of carbonates, the weak acid (e.g., acetic acid) can be separated from the concentrated divalent ion salt solution via distillation. The gas stream is then injected or introduced into the carbonation reactor (e.g., a stirred-tank reactor) containing the diluted solution to precipitate carbonates, as given by:

$$MA_2 + CO_2 + H_2O \rightarrow MCO_3(s) + 2HA \qquad (3)$$

As an example, acetic acid can be used in stage (2) as it is a weaker acid (acid dissociation constant $pK_a$ of about 4.76 at 298 K) than carbonic acid ($pK_a$ of about 3.6 at 298 K). Thus, carbonates of the divalent ions ($MCO_3(s)$) are precipitated while the weak acid (HA) is regenerated in the solution. Higher conversion of $MCO_3$ can be achieved by increasing the $CO_2$ partial pressure to increase the concentration of dissolved carbon in the liquid, for example, through $CO_2$ enrichment or application of elevated pressure (e.g., above ambient pressure and up to about 30 bar to about 40 bar) to the gas stream. In addition, when co-located with a thermal power plant as the $CO_2$ source, waste heat from the power plant can be harvested to increase the temperature of the carbonation process to above about 45° C., at which condition the precipitation of carbonates becomes strongly stimulated by both thermodynamics and kinetics. Under such conditions, carbonate conversion can reach to about 70% to about 80%. As the injected $CO_2$ is mineralized, the produced carbonates can be collected by separating the precipitates from the liquid using filtration. It should be noted that the pH of the weak acid solution (e.g., about 4 to about 5) at the end of this stage should be above the pH of the carbonic acid solution. The acid solution remaining in the reactor is then concentrated and reused in stage (2). The concentration can be performed by a process such as distillation and solvent extraction, although nanofiltration is desirable to reduce the operating cost.

A variation of the buffer-free process cycle involves the use of a regenerable natural or synthetic ion exchanger. In particular, a $CO_2$-enriched solution is produced by, for example, injecting or introducing a $CO_2$-containing gas stream into water (or a brine solution or another solution), and increasing the concentration of dissolved carbon in the solution through $CO_2$ enrichment or application of elevated pressure (e.g., above ambient pressure and up to about 30 bar to about 40 bar) to the gas stream. An ion exchanger is then added or introduced into, or otherwise combined with, the $CO_2$-enriched solution to promote ion exchange, in which protons ($H^+$) included in the $CO_2$-enriched solution are exchanged with alkali metal cations (e.g., $N^+$, where $N^+$ is $Na^+$, $K^+$, and so forth) included within the ion exchanger, producing a bicarbonate salt solution ($NHCO_3^{2-}$). Examples of suitable ion exchangers include heterogeneous ion exchangers, such as polymer-supported ion exchangers in a particulate form of ion exchange polymer beads including functional groups that can form complexes with exchangeable cations. Additional examples of heterogeneous ion exchangers include silicate minerals (e.g., a clay or a zeolite) supporting ion exchange reactions. Next, a divalent ion solution (e.g., a brine solution) is added or introduced into, or otherwise combined with, the bicarbonate salt solution, inducing precipitation of carbonates of the divalent ions ($MCO_3(s)$). The divalent ion solution can be an untreated brine solution or can be a concentrated divalent ion solution (e.g., the concentrated divalent ion salt solution ($MA_2$) from stage (2)). The heterogeneous ion exchanger can be removed from the solution by filtration and then regenerated effectively by its subsequent exposure to an alkali metal cation solution (e.g., a brine solution).

Embodiments of this disclosure provide a sustainable process cycle for $CO_2$ sequestration and production of carbonates using brines. The brines can be obtained as waste streams from industrial operations such as desalination or treatment of produced water generated from oil and gas extractions. The process cycle can be operated as a $CO_2$ capture method in post-combustion flue gas treatment to reduce the carbon emissions of coal-fired power plants. In addition, the process cycle also produces carbonates that can be used in construction, chemical, paper, sealants/adhesives, cosmetics, pharmaceutical, and food industries.

Advantages of the process cycle of some embodiments include:

1) It is an integrated process to simultaneously mineralize $CO_2$ and pretreat waste brines for further treatment.

2) Compared with other mineralization processes which use alkaline solids (e.g., serpentine, slag and fly ash), the process cycle is advantageous because the amount of brine available allows for the realization of $CO_2$ sequestration at a gigaton scale while omitting energy-intensive operations of material pre-treatment, such as grinding, milling, and heat-treatment. In addition, the process cycle generates valuable products, namely carbonate salts, which have a wide range of industrial applications.

3) Other carbonation processes of seawater or brines which do not feature an enrichment stage involve large amounts of alkaline buffers, which is either expensive (e.g., NaOH) or is limited in supply (e.g., alkaline wastes). In the process cycle of some embodiments, relevant reagents are recycled and reused. Also, the process cycle can omit an energy-intensive stage such as electrolysis. As such, the process cycle can substantially lower the operational cost of brine mineralization.

In summary, the proposed process cycle treats waste streams (e.g., both $CO_2$ and brines) sustainably at a reduced chemical or energy use and while deriving valuable carbonate products. As such, operational costs can be significantly reduced. Furthermore, the treated water exhibits a high potential for reuse in agriculture, irrigation, and animal consumption.

The following are example embodiments of this disclosure.

First Aspect

In an aspect according to some embodiments, a method includes: (1) using a chelating agent, extracting divalent ions from a brine solution as complexes of the chelating agent and the divalent ions; (2) using a weak acid, regenerating the chelating agent and producing a divalent ion salt solution; and (3) introducing carbon dioxide to the divalent ion salt solution to induce precipitation of the divalent ions as a carbonate salt.

In some embodiments, extracting the divalent ions includes introducing the chelating agent to the brine solution, followed by subjecting the brine solution to filtration.

In some embodiments, subjecting the brine solution to filtration is performed by at least one of ultrafiltration, nanofiltration, or reverse osmosis.

In some embodiments, subjecting the brine solution to filtration includes producing a retentate solution including the complexes of the chelating agent and the divalent ions.

In some embodiments, a concentration of the divalent ions in the retentate solution is about 1.5 times or greater than a concentration of the divalent ions in the brine solution, such as about 2 times or greater, about 5 times or greater, about 10 times or greater, about 20 times or greater, about 50 times or greater, and up to about 100 times or greater.

In some embodiments, regenerating the chelating agent includes introducing the weak acid to the retentate solution to induce precipitation of the chelating agent and to produce the divalent ion salt solution.

In some embodiments, the weak acid has a $pK_a$ greater than about 3.6 at 298 K, such as about 3.7 or greater, about 3.8 or greater, about 3.9 or greater, about 4 or greater, about 4.3 or greater, about 4.5 or greater, or about 4.7 or greater, and up to about 8 or greater, up to about 10 or greater, or up to about 12.

In some embodiments, regenerating the chelating agent includes adjusting the pH of the retentate solution to about 4 or below, such as about 3.9 or below, about 3.7 or below, about 3.5 or below, about 3.3 or below, about 3.1 or below, about 2.9 or below, about 2.7 or below, about 2.5 or below, about 2.3 or below, about 2.1 or below, about 2 or below, or about 1 to about 3.

In some embodiments, the method further includes adjusting the pH of the divalent ion salt solution to above about 3.6, prior to introducing the carbon dioxide.

In some embodiments, introducing the carbon dioxide includes inducing precipitation of at least one of calcium carbonate or magnesium carbonate, or other carbonates (e.g., barium carbonates) or other related solids.

Second Aspect

In another aspect according to some embodiments, a method includes: (1) combining water with carbon dioxide to produce a carbon dioxide solution; (2) introducing an ion exchanger to the carbon dioxide solution to induce exchange of alkali metal cations included in the ion exchanger with protons included in the carbon dioxide solution and to produce a bicarbonate salt solution of the alkali metal cations; and (3) introducing a brine solution to the bicarbonate salt solution to induce precipitation of divalent ions from the brine solution as a carbonate salt.

In some embodiments, the ion exchanger is a heterogeneous ion exchanger.

In some embodiments, the heterogeneous ion exchanger is a polymer-supported ion exchanger.

In some embodiments, the heterogeneous ion exchanger is a silicate mineral to support ion exchange reaction.

In some embodiments, the method further includes recovering the heterogeneous ion exchanger by filtration.

In some embodiments, the method further includes regenerating the heterogeneous ion exchanger by exposing the heterogeneous ion exchanger to an alkali metal cation solution.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A method comprising:
   combining water with carbon dioxide to produce a carbon dioxide solution;
   introducing an ion exchanger to the carbon dioxide solution to induce exchange of alkali metal cations included in the ion exchanger with protons included in the carbon dioxide solution and to produce a bicarbonate salt solution of the alkali metal cations; and
   introducing a brine solution to the bicarbonate salt solution to induce precipitation of divalent ions from the brine solution as a carbonate salt.

2. The method of claim 1, wherein the ion exchanger is a heterogeneous ion exchanger.

3. The method of claim 2, wherein the heterogeneous ion exchanger is a polymer-supported ion exchanger.

4. The method of claim 2, wherein the heterogeneous ion exchanger is a silicate mineral to support ion exchange reaction.

5. The method of claim 2, further comprising recovering the heterogeneous ion exchanger by filtration.

6. The method of claim 5, further comprising regenerating the heterogeneous ion exchanger by exposing the heterogeneous ion exchanger to an alkali metal cation solution.

* * * * *